US012241047B2

(12) United States Patent
Pawlak

(10) Patent No.: US 12,241,047 B2
(45) Date of Patent: Mar. 4, 2025

(54) SYSTEMS AND METHODS FOR THE PREPARATION OF ETHANOL-CONTAINING BEVERAGES USING MICROORGANISMS

(71) Applicant: Next Century Spirits, LLC, Raleigh, NC (US)

(72) Inventor: Joel J. Pawlak, Raleigh, NC (US)

(73) Assignee: Next Century Spirits, LLC, Raleigh, NC (US)

( * ) Notice: Subject to any disclaimer, the term of this patent is extended or adjusted under 35 U.S.C. 154(b) by 380 days.

(21) Appl. No.: 17/628,684

(22) PCT Filed: Jul. 22, 2020

(86) PCT No.: PCT/US2020/043056
§ 371 (c)(1),
(2) Date: Jan. 20, 2022

(87) PCT Pub. No.: WO2021/016344
PCT Pub. Date: Jan. 28, 2021

(65) Prior Publication Data
US 2022/0267702 A1 Aug. 25, 2022

Related U.S. Application Data

(60) Provisional application No. 62/876,845, filed on Jul. 22, 2019.

(51) Int. Cl.
C12G 3/07 (2006.01)
C12H 1/00 (2006.01)
C12H 1/22 (2006.01)
(52) U.S. Cl.
CPC .............. *C12G 3/07* (2019.02); *C12H 1/006* (2013.01); *C12H 1/22* (2013.01)

(58) Field of Classification Search
CPC . C12G 3/07; C12H 1/006; C12H 1/12; C12H 1/22
USPC ................................ 99/276, 277.1, 277, 278
See application file for complete search history.

(56) References Cited

U.S. PATENT DOCUMENTS

| | | | | | |
|---|---|---|---|---|---|
| 485,012 | A | * | 10/1892 | Kreusler | ...................... 99/277.1 |
| 540,279 | A | * | 6/1895 | Steen | ........................... 99/277.1 |
| 554,851 | A | * | 2/1896 | Wittemann | .................. 99/277.1 |
| 2,447,390 | A | | 8/1948 | Brand | |
| 3,071,469 | A | * | 1/1963 | Krabbe | ..................... C12H 1/22 |
| | | | | | 426/477 |
| 3,627,544 | A | * | 12/1971 | Bosewitz et al. | ..... C12C 11/075 |
| | | | | | 99/276 |
| 5,906,151 | A | | 5/1999 | Firestone et al. | |
| 2012/0164300 | A1 | | 6/2012 | Nizai | |

(Continued)

OTHER PUBLICATIONS

Notification of International Search Report and the Written Opinion, PCT/US2020/043056, Oct. 27, 2020, 12 pages.

*Primary Examiner* — Reginald Alexander
(74) *Attorney, Agent, or Firm* — Bradley Arant Boult Cummings LLP; Henry B. Ward, III

(57) ABSTRACT

The present inventive concept relates generally to simulating the barrel aging or finishing process of alcohol-containing products in a rapid manner using various microorganisms to impart flavors and aromas during the aging or finishing process. Products and methods used in the process of aging or finishing the alcohol-containing products are also provided.

8 Claims, 2 Drawing Sheets

(56) References Cited

U.S. PATENT DOCUMENTS

2015/0030721 A1    1/2015   Strydom et al.
2017/0313973 A1   11/2017   Guzzo et al.

* cited by examiner

SYSTEMS AND METHODS FOR THE PREPARATION OF ETHANOL-CONTAINING BEVERAGES USING MICROORGANISMS

RELATED APPLICATION DATA

This application is a 35 U.S.C. § 371 National Stage Entry of International Application No. PCT/US2020/043056 having an international filing date of Jul. 22, 2020, which claims the benefit of U.S. Provisional Application No. 62/876,845, filed Jul. 22, 2019, the contents of which are hereby incorporated herein by reference in their entireties.

FIELD

The present invention relates generally to simulating the aging or finishing process of ethanol-containing liquids in a rapid manner using various microorganisms to impart flavors and aromas during the aging or finishing process.

BACKGROUND

A variety of foods and beverages are aged and flavored using wood barrels to impart wood and other flavors. The pretreatment of the wood can significantly alter the resulting flavors imparted to the product. For example, in whiskey production it is common to char the barrels and toast the staves making up the barrels to alter the resulting end quality of the whiskey. The wood may also be aged outside for a duration of time before being used to make the barrels as it is known to improve the quality of the resulting whiskey. In wine, it is common to use wood chips toasted to varying degrees to add wood flavors to the wine. This toasting process breaks down the various carbohydrates and lignins in the wood and allows them to come out of the wood structure more readily. These pretreatments can be important aspects of the liquid flavoring process.

Even with these pretreatments of the wood, it still typically takes years to achieve the flavors desired for quality flavored products. This is especially true for whiskey and vinegar (e.g., balsamic vinegar) where the liquids can be aged for very long durations (e.g., 20 or more years in some cases).

The aging process has been studied extensively. It is known that many of the aromas and flavors in the finished production are from esters formed during the aging process. These esters are thought to arise from slow reactions that take place between the liquid and materials extracted from the wood. These reactions have a relatively high activation energy and thus can only be expedited if catalyzed by high temperature, pressure, and/or the presence of an inorganic catalyst.

Many of the esters derived during the aging process can also be produced through biological means. For example, fruit smells are also produced from fruits. These processes are significantly faster than what is observed in traditional barrel aging.

It is known that a number of biological entities have the ability to metabolize ethanol into various products. It is hypothesized that biological growth of fungus, yeasts, bacteria and/or other microbes are responsible for the creation of esters associated with the aging of whiskeys such as bourbon, Canadian whiskey, Irish whiskey, scotch as well as rums, tequila, and other spirits. This is supported by a number of factors. First, it is known that whiskey "ages" best at about 100 degrees Fahrenheit. Higher temperatures and lower temperatures tend to be less effective for the aging process. This temperature correlates well with what most biological systems prefer for their optimum growing temperature. Second, previous work has shown that many of the esters associated with aging are products of the ethanol. This was supported by work of Baldwin and Byrne (Baldwin and Byrne, "Chemical mechanism of whiskey maturation", Annual Meeting of the American Society of Enologists, Jun. 24-27, 1981, San Diego, California, USA) that used carbon 14 tagging of ethanol to track what formed from ethanol. While this is straightforward for simple esters such as ethyl acetate, for more complex esters, it is more difficult to imagine the formation of such esters directly from the ethanol. This supports the notion that a biological mechanism is taking place. Third, the literature supports that complex esters can be made using high temperatures, pressures, and catalysts. This creates the fruity flavors often associated with aged whiskeys. A second source of fruity esters is, fruit itself, a biological entity. Additionally, *Acetobacters* and *Glucanobaters* are well known consumers of ethyl alcohol in wines where they convert ethyl alcohol into acetic acid which is a precursor to the formation of ethyl-acetate, which is a common compound found in aged whiskeys. These bacteria can also produce acetaldehyde, which is another compound associated with aged whiskey (Guillamon, J. M., Mas, A., "Acetic Acid Bacteria", Molecular Wine Microbiology, 2011; Esteve-Zarzoso, B. et al, "Applied Wine Microbiology", Molecular Wine Microbiology, 2011; Jackson, R. S., "Postfermentation Treatments and Related Topics", Wine Science (Third Edition), 2008; Jackson, R. S., "Post-Fermentation Treatment and Related Topics", Wine Science (Fourth Edition), 2014). Thus, it seems plausible that biology is in fact acting to create these flavors. Fourth, it is well known in the brewing industry that the type of yeast, temperature, and other factors influence the fruitiness of the resulting brew. Thus, it is known that biological entities can influence the fruitiness of the final product. Fifth, new oak barrels tend to create more robust fruity flavors. This can be attributed to the higher amount of soluble materials in new barrels. However, in barrel aging, very few organisms can live in high proof ethanol and may be relegated to small interfaces between the high ethanol content in the barrel and the gradient that exists in the wooden barrel.

Thus, there is a need for additional methods of aging and/or finishing alcohol-containing products, particularly high proof ethanol-containing beverages.

SUMMARY

Embodiments of the present invention provide methods of using microorganisms for the enhanced flavoring of ethanol-containing substances such as whiskey, vinegar, and other liquids that are aged in wood barrels, including but not limited to, tequila, rum, cognac, brandy, wine, port, etc.

In particular, embodiments of the present invention include methods of preparing an ethanol-containing beverage including subjecting a source of ethanol to a wood material and an extraction process under conditions to support controlled growth of microorganisms to provide an ethanol-containing beverage. The method can include subjecting the source of ethanol to a series of containers. The microorganisms are selected from at least one of yeasts, fungi, mold, bacteria and/or other microbes.

Embodiments of the present invention further include a system for preparing an ethanol-containing beverage including a series of containers, wherein the containers include a partition to divide the interior space of the container; a valve configured to prevent a liquid from flowing freely between the containers; and a heating mechanism. The containers may also include a biological growth medium and/or physical support to facilitate the growth of microorganisms and the containers may be connected by a conduit system.

Embodiments of the present invention also include a system for preparing an ethanol-containing beverage including multiple containers including a wood material; and a heating mechanism. The multiple containers may also include a biological growth medium and/or physical support to facilitate the growth of microorganisms.

Embodiments of the present invention further provide a rapidly finished alcohol-containing beverage that is similar to a product that has been aged in barrels produced by the methods described herein. Embodiments of the present invention further provide a blended alcohol-containing product produced by the methods described herein.

Embodiments of the present invention further provide wood materials that include a combination of microorganisms selected to provide a specific chemical signature and/or sensory profile to an alcohol-containing product.

Embodiments of the present invention also provide a method of making a wood material including a combination of microorganisms selected to provide a specific chemical signature and/or sensory profile to an alcohol-containing product, the method includes exposing a wood material to a specific combination of microorganisms.

Further embodiments of the present invention include a system including a housing, a wood material, a combination of microorganisms; and optionally instructions for using the wood material and/or storage conditions for the wood material, and/or microorganisms, wherein the microorganisms are selected to provide a specific chemical signature and/or sensory profile to an end product derived from using the wood material.

BRIEF DESCRIPTION OF THE DRAWINGS

Figure 1:
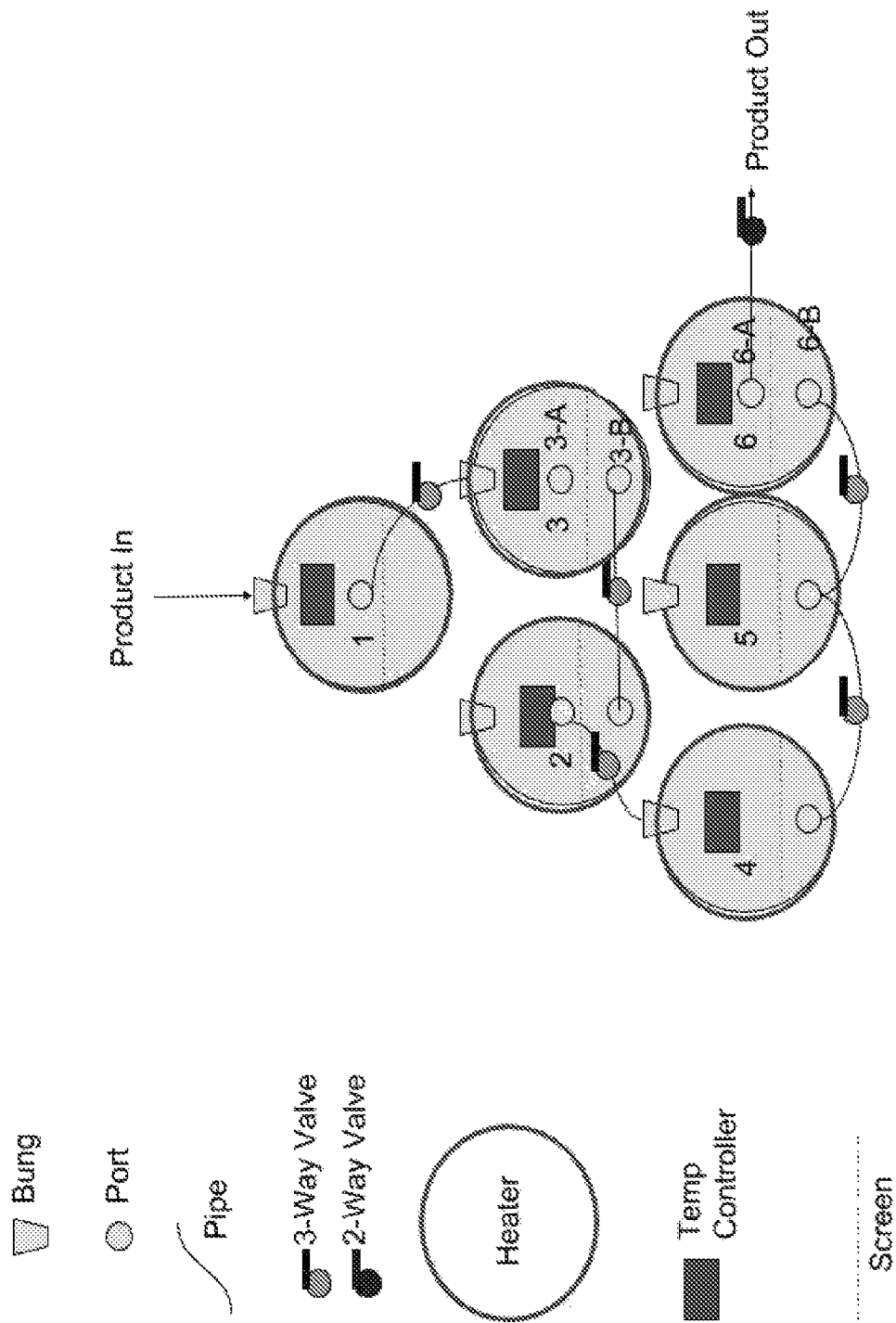

Having thus described the presently disclosed subject matter in general terms, reference will now be made to the accompanying Figure wherein:

FIG. 1 depicts a schematic description of the technology using barrels and screens to create a gradient of liquid through a bed of wood chips.

Figure 2:
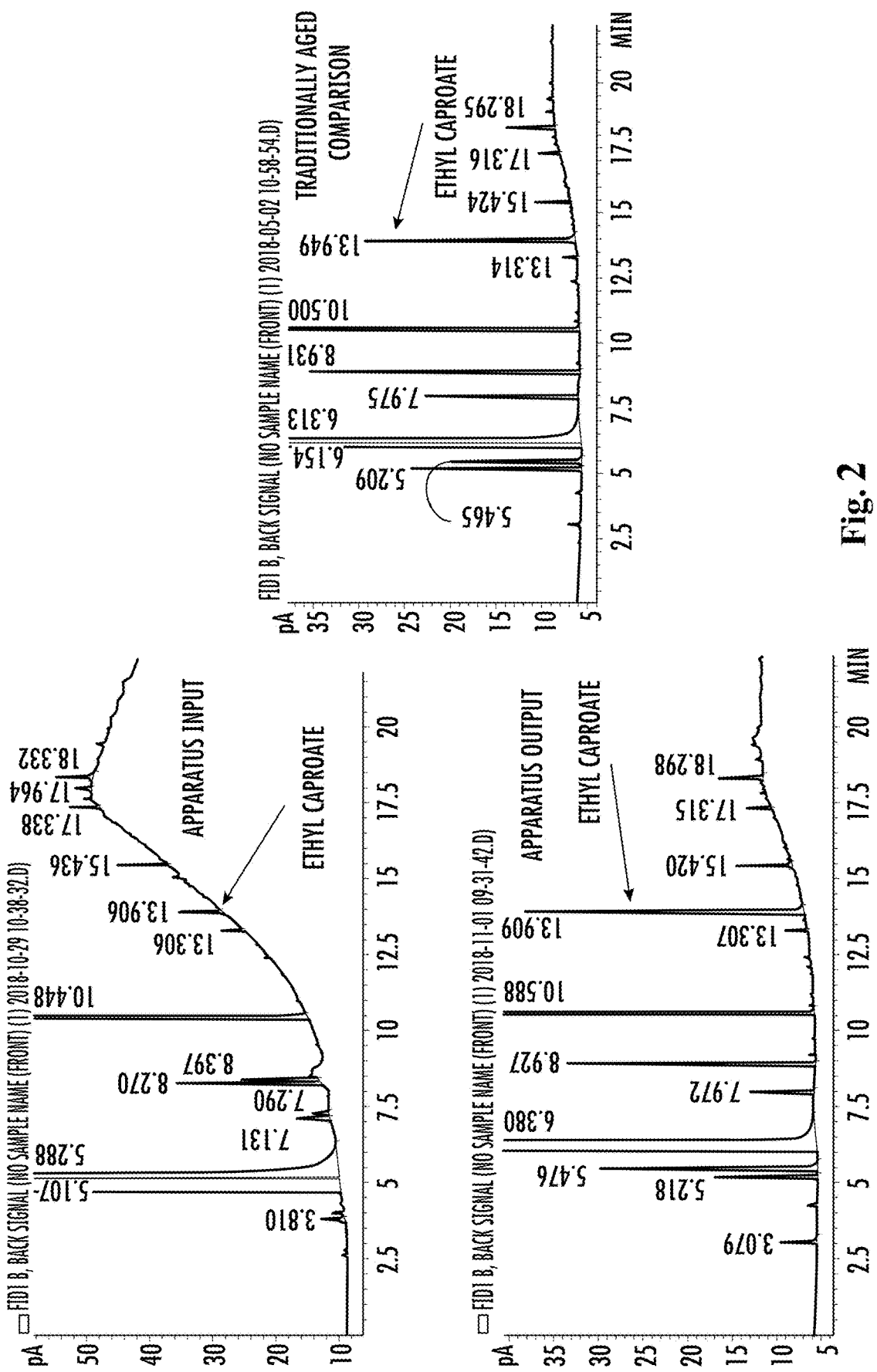

FIG. 2 presents a gas chromatograph of the input and output of the technology according to embodiments of the present invention compared to the input and output of a traditionally aged product.

DETAILED DESCRIPTION

Hereinafter, embodiments of the invention will be described more fully. Embodiments may, however, be embodied in many different forms and should not be construed as limited to the embodiments set forth herein. Rather, these embodiments are provided so that this disclosure will be thorough and complete, and will fully convey the scope of the embodiments to those of ordinary skill in the art.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, or a combination thereof, but do not preclude the presence or addition of one or more other features, numbers, steps, operations, elements, components, or a combination thereof. Further, according to embodiments of the present invention, the present invention may comprise, consist essentially of or consist of the elements described herein.

As used herein, the term "and/or" includes any and all combinations of one or more of the associated listed items. Expressions such as at "least one of", when preceding a list of elements, modify the entire list of elements and do not modify the individual elements of the list.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All patent and patent application references referred to in this patent application are hereby incorporated by reference in their entirety as if set forth fully herein.

The present disclosure relates to methods and systems for the preparation of alcohol-containing products, and more particularly, the accelerated preparation of alcohol-containing beverages as well as finishing of the same using various microorganisms to impart flavors and aromas during the aging or finishing process.

According to embodiments of the present invention, a method by which the liquid to be aged is first subjected to fresh wood materials. This may be a barrel, staves, wood chips, wood flakes, shavings, powdered wood, or wood extractions. This fresh wood material may be pretreated by toasting, degradation with enzymes, fungus, bacteria, other microorganisms or other chemicals or physical processes including heat and pressure to enhance the removal of wood carbohydrates and lignins. This liquid enhanced with wood materials or extractions is then passed through a bed of wood chips. The wood chips may be mixed with charcoal or other carbon materials to act as an absorbent for undesirable flavors or aromas. In some embodiments, the bed of wood chips is only partially submerged in the liquid so that a gradient of ethanol and water exists throughout the bed of chips. In some embodiments, the bed of wood chips may be inoculated with yeasts, fungus, mold, bacteria or other microorganisms that are capable of living in the gradient of ethanol concentration under the conditions to support the maintenance and/or controlled growth of selected microorganisms added to the wood material.

Alternatively, the yeasts, fungus, mold, bacteria or other microorganisms may be added to the liquid, suspended on and/or in a biological growth media and/or support conducive to the maintenance and/or controlled growth of selected microorganisms added to the liquid and/or wood material. Such examples may include paper type materials composed of cellulose fiber or other natural fibers, non-woven materials made of synthetic polymers such as polyethylene, poly-lactic acid, poly-ester, polypropylene, poly-ethylene terephthalate, rayon, regenerated cellulose, glass-fibers, and other synthetic organic and in-organic fibers. The support media may also be composed of porous materials such as a cellulose sponge, solid foams made from a variety of polymers including, but not limited to, polyethylene, poly-lactic acid, poly-ester, polypropylene, poly-ethylene terephthalate, rayon, regenerated cellulose, glass, chitin, chitosan, starch, hemicelluloses, and other materials capable of forming a biological support. Furthermore, the container for the liquid may be constructed such that yeasts, fungus, mold, bacteria or other microorganisms are capable of living in the porous structure of the container. As an example, wood may contain in the structure yeasts, fungus, mold, bacteria or other microorganisms where a gradient of ethanol and moisture is set up through the thickness of the wood. Other containers may be constructed such that there exists a gradient of ethanol and water through the thickness of the container. These may be constructed of materials such as polyethylene, poly-lactic acid, poly-ester, polypropylene, poly-ethylene terephthalate, rayon, regenerated cellulose, glass-fibers, and other synthetic organic and in-organic such that a micro-pore structure exists in the material. The liquid is typically a high proof ethanol liquid such as distilled spirits suitable for making whiskey, rum, tequila, or other spirits. The liquid may also be a lower proof ethanol containing liquid such as a wine or vinegar. The wood chips are contained inside a vessel that may be composed of stainless steel, glass, plastic, wood, or other suitable material capable of containing the liquid. The vessel is then heated to temperature conducive to the growth of the organism. This temperature may be in the range of about 23 degree Celsius to about 60 degree Celsius. The heating may be done directly or indirectly. The vessel should be sealed in a manner that the amount of oxygen within the vessel can be controlled or eliminated. The chips should be situated such that a portion of the chips can become "dry" or not completely saturated with liquid. That is, that there is no free liquid in at least some portion of the chip bed. The level is then maintained at the desired temperature for a period of time from about one hour to about one month. The level is then increased to submerge the chip bed for a period from about 1 minute to about two days before it is again reduced in level. This process washes the desired products off the organisms growing at the interface between the liquid and the air in the vessel. The process is then repeated. The wood enhanced liquid continues to provide fresh nutrients and materials needed to create the desired flavors and aromas. This chip bed can be reused for numerous repeated steps. Multiple vessels may be used in series or parallel containing different organisms or held at different temperatures to create different flavors and aromas. Furthermore, the same liquid may be recirculated through the same vessel to progressively impart flavors and aromas to the liquids.

According to other aspects, the present invention provides methods for preparing an ethanol-containing product including subjecting a source of ethanol to a wood material and an extraction process under conditions to support controlled growth of microorganisms to provide an ethanol-containing beverage. The methods may also include subjecting the source of ethanol to a series of containers. The series of containers is selected from wood barrels, bottles, flask, jars and/or the like. The system may be configured such that product may be added to and/or removed from individual containers. "Product" as used herein may refer to the contents of the container or a portion thereof and/or components added to the contents of the container, e.g., flavoring, coloring, aromas, microorganisms, etc. In some embodiments, the containers may be connected through a conduit system having a valve between each container. The conduit system may be a piping system composed of a suitable material such as a metal, glass, rubber, etc. In particular embodiments, at least one of the containers is subjected to heat. Additionally, a controlled amount of gas can be added and/or removed from an individual container. In some embodiments, the gas is air, oxygen, nitrogen, carbon dioxide, or helium. Air includes a combination of gases that may include varying amounts of nitrogen, oxygen, argon, carbon dioxide, neon, methane, helium, krypton, hydrogen, xenon, ozone, nitrogen dioxide, iodine, carbon monoxide and/or ammonia. In other embodiments, the wood material is partially submerged in a liquid providing the source of ethanol so that a gradient of ethanol and water exists throughout the wood material. The wood material is any one of staves, chips, flakes, shavings, powdered wood and/or wood extractions. The wood material may also be subjected to heat, toasted, charred, subjected to pressure, treated with enzymes and/or exposed to microorganisms. The wood may be treated with a temperature in the range of about 100 degree Celsius to about 325 degree Celsius and a range of pressures from about 101 kPa to about18.7 MPa. The enzymes may include cellulases, hemicellulases, per-oxidases, lipases, proteases, etc. The microorganisms are selected from at least one of yeasts, fungi, mold, bacteria or other microbes. The microorganisms may remain on the substrate and/or in the final product, or may be partially or completely removed during the process or at the conclusion of the process.

A variety of yeast species and strains can be used in accordance with embodiments herein, and genetically modified variants, or synthetic yeast based on a "chassis" of a known species can be provided. Exemplary yeasts with industrially applicable characteristics, which can be used in accordance with embodiments herein include, but are not limited to, *Saccharomyces* species (for example, *Saccharomyces cerevisiae, Saccharomyces bayanus, Saccharomyces boulardii*), *Candida* species (for example, *Candida utilis, Candida krusei*), *Schizosaccharomyces* species (for example *Schizosaccharomyces pombe, Schizosaccharomyces japonicas*), *Pichia* or *Hansenula* species (for example, *Pichia pastoris* or *Hansenula polymorpha*) species, *Zygosaccharomyces* species, *Aureobasidium* species, *Kloeckera* species, *Brettanomyces* species (for example, *Brettanomyces claussenii*). Particular yeasts include *Saccharomyces cerevisiae* and *S. carlsburgiensis*. In particular embodiments, at least one microorganism is one or more yeasts.

A variety of fungal species and strains can be used in accordance with embodiments herein, and genetically modified variants, or synthetic fungi based on a "chassis" of a known species can be provided. Exemplary fungi with industrially applicable characteristics, which can be used in accordance with embodiments herein include, but are not limited to the genus *Penicillium, Cunninghamella, Verticillium, Beauveria, Mortieriella, Phoma, Scolecobasidium, Tolypocladium, Aspergillus, Graphium, Paecilomyces, Fusarium, Acremonium, Mortierella, Gliocladium, Trichoderma,* or *Sphaeropsidales*. In particular embodiments, at least one microorganism is one or more fungi.

A variety of mold species and strains can be used in accordance with embodiments herein, and genetically modified variants, or synthetic mold based on a "chassis" of a known species can be provided. Exemplary molds with industrially applicable characteristics, which can be used in accordance with embodiments herein include, but are not limited to, *Absidia, Acremonium, Alternaria, Aspergillus, Aureobasidium, Baudoinia* (e.g., sp. *Compniacensis*), *Chaetomium, Chrysonilia, Cladosporium, Curvularia, Emericella, Epicoccum, Eurotium, Fusarium, Geomyces, Geotrichum, Gliocladium, Gliomastix, Memnoniella, Mucor, Myrothecium. Oidiodendron, Paecilomyces, Penicillium, PhialophoraPhoma, Scopulariopsis, Sistotrema, Stachybotrys, Trichoderma, Ulocladium* and *Wallemia*. In particular embodiments, at least one microorganism is one or more molds. In some embodiments the mold is a *Penicillium*. In other embodiments, the mold is *Penicillium chrysogenum, Penicillium claviforme, Penicillium commune, Penicillium crustosum, Penicillium digitatum, Penicillium echinulatum, Penicillium expansum, Penicillium glabrum, Penicillium imranianum, Penicillium italicum, Penicillium lacussarmientei, Penicillium lusitanum, Penicillium purpurogenum, Penicillium roqueforti, Penicillium stoloniferum, Penicillium ulaiense, Penicillium verrucosum* and/or *Penicillium viridicatum*. In still other embodiments, the mold is *Penicillium* sp. SCAU-F-3 and/or *Penicillium* sp. SCAU-F-191.

A variety of bacterial species and strains can be used in accordance with embodiments herein, and genetically modified variants, or synthetic bacteria based on a "chassis" of a known species can be provided. Exemplary bacteria with industrially applicable characteristics, which can be used in accordance with embodiments herein include, but are not limited to, *Bacillus* species (for example, *Bacillus coagulans, Bacillus subtilis*, and *Bacillus licheniformis*), *Paenibacillus* species, *Streptomyces* species, *Micrococcus* species, *Corynebacterium* species, *Acetobacter* species, *Glucanobacter* species, *Cyanobacteria* species, *Salmonella* species, *Staphylococcus* species, (for example, *S. aureus, S. auricularis, S. carnosus, S. epidermidis, S. haemolyticus, S. hyicus-intermedius, S. lugdunensis, S. saprophyticus, S. sciuri, S. simulans, S. warneri*), *Rhodococcus* species, *Pseudomonas* species, *Lactobacillus* species, *Enterococcus* species, *Alcaligenes* species, *Klebsiella* species, *Paenibacillus* species, *Arthrobacter* species, *Corynebacterium* species, *Brevibacterium* species, *Thermus aquaticus, Pseudomonas stutzeri, Clostridium thermocellus*, and *Escherichia coli*. In particular embodiments, at least one microorganism is one or more bacteria. In some embodiments, the bacterium is a *Bacillus* species and/or a *Staphylococcus* species. In still other embodiments, the bacterium is *Staphylococcus warneri, Staphylococcus pasteuri* and/or *Terribacillus goriensis*.

Methods of the present invention also include adding a flavoring component to the containers. The flavoring component imparts one or more of an aroma and/or a flavor selected from a group consisting of caramel, cinnamon, nutmeg, smoke, vanilla, maple syrup aromas or flavors, and combinations thereof. Also into the containers may be added spices, fruits, flowers, herbs, berries (such as strawberries, blueberries, blackberries, raspberries, acai berries, cranberries, elderberries, mulberries, lingonberries and boysenberries) nuts, vegetables, wood, grass, plants and/or other organic matter as described herein including parts and/or portions thereof.

Embodiments of the present invention also provide a system for preparing an ethanol-containing beverage, wherein the containers include a partition to divide the interior space of the container; a valve configured to prevent a liquid from flowing freely between the containers; and a heating mechanism. The system may be configured such that product may be added to and/or removed from individual containers. In some embodiments, the containers may be connected through a conduit system having a valve between each container. Additionally, a controlled amount of gas can be added and/or removed from an individual container. In some embodiments, the gas is air, oxygen, nitrogen, carbon dioxide or helium. The containers may include a biological growth medium and/or physical support to facilitate the growth of microorganisms. The containers may also include a wood material. The wood material may be any one of staves, chips, flakes, shavings, powdered wood and/or wood extractions. The wood material may be new, used or clean wood material. The wood material may be subjected to heat, toasted, charred, subjected to pressure, treated with enzymes and/or exposed to microorganisms. The containers may be wood barrels. The heating mechanism may be a heating pad, blanket, heat gun, heater, hot air bath, water bath, or any suitable heat source.

Embodiment of the present invention also provide a system for preparing an ethanol-containing product including multiple containers including a wood material; and a heating mechanism. The system may be configured such that product may be added to and/or removed from individual containers. Additionally, a controlled amount of gas can be added and/or removed from an individual container. In some embodiments, the gas is air, oxygen, nitrogen, carbon dioxide or helium.

The multiple containers may also include a biological growth medium and/or physical support to facilitate the growth of microorganisms. The containers may further include a wood material where the wood material may be subjected to heat, toasted, charred, subjected to pressure, treated with enzymes and/or exposed to microorganisms.

In particular embodiments, the system is compact and/or portable. In such instances, the system may be a home or table-top apparatus. As the system is scalable, in other embodiments, the system is larger and provides scalability for larger commercial applications including micro-distilleries, craft distilleries and/or commercial distilleries. In some embodiments, the apparatus range in a capacity size from 1 liter to 2500 gallons, including all numerical values in between. Regardless of size, the apparatus may provide accelerated aging and/or finishing of the alcohol-containing beverage resulting in a product that is cost-effective and having taste, flavor, mouthfeel, body, aroma, and/or color comparable to alcohol-containing beverages aged and/or finished in a conventional manner. In general, the system provides alcohol-containing beverages that have a chemical signature or sensory profile (e.g. taste, flavor, mouthfeel, body, aroma, and/or color), similar to or the same as a chemical signature or sensory profile of alcohol-containing beverages obtained with conventional aging and/or finishing techniques.

Embodiments of the present invention also provide a wood material including a combination of microorganisms selected to provide a specific chemical signature and/or sensory profile to an end product. That is, specific microorganisms are selected based on the microorganism's ability to impart a desired characteristic to the end product in view of the microorganism's application to the wood material. In particular embodiments, the end product is an alcohol-containing product. In further embodiments, the microorganisms are selected to provide a chemical signature and/or sensory profile that is similar to or the same as an alcohol-containing beverage obtained with a conventional aging and/or finishing process. In particular embodiments, the wood material is any one of a barrel, staves, chips, flakes, shavings, powdered wood and/or wood extractions. In further embodiments, microorganisms are selected from at least one of yeasts, fungi, molds and bacteria as discussed above. Additionally, the wood material may include a flavoring component.

Methods of making a wood material including a combination of microorganisms selected to provide a specific chemical signature and/or sensory profile to an end product, such as an alcohol-containing beverage is also provided herein. The method includes exposing a wood material to a specific combination of microorganisms selected from at least one of yeasts, fungi, mold and bacteria as described herein. The method may also include adding a flavoring component to the wood material. The wood material may be a new, used or clean wood material.

It is contemplated that the custom wood materials described herein including a combination of microorganisms selected to provide a specific chemical signature and/or sensory profile to an end product derived from using the wood material can be used and/or sold independently, for example, single wood chips. Yet, some embodiments provide a kit, packaging or a system including a housing, a wood material, which may include a combination of microorganisms in or on the wood material, or a combination of microorganisms to be applied to the wood material; and optionally instructions for using the wood material and/or storage conditions for the wood material and/or microorganisms, wherein the microorganisms are selected to provide a specific chemical signature and/or sensory profile to the end product, for example, an alcohol-containing beverage. In particular embodiments, the housing is packaged to maintain a level of the microorganisms or support the controlled growth of the microorganisms. The microorganisms may be selected from at least one of yeasts, fungi, mold and bacteria as described herein. Further, the wood material is any one of a barrel, staves, chips, flakes, shavings, powdered wood and/or wood extractions. The wood material may also include a flavoring component and/or enzymes. The packaging including the wood material, the combination of microorganisms and optional instructions for using the wood material and/or storage conditions for the wood material and/or microorganisms may also include a flavoring component and/or enzymes.

While the preparation of distilled alcohol-containing beverages, for example, a whiskey or whiskey-flavored product, are described by example herein, other distilled alcohol or ethanol-containing beverages, for example, but not limited to, brandy, gin, rum, scotch, tequila, vodka, boukha or thibarine as well as nondistilled ethanol-containing beverages, for example, beer, mbege, mead, cider or wine, may also be considered within the scope of the present disclosure. Furthermore, ethanol containing liquids that are created by mixing together ethanol or ethanol solution with a non-ethanol containing solution for the purpose of aging or finishing may be included as well. As an example, vinegar may have an ethanol content added to it processed with the technology described herein and then the ethanol content may be distilled off to leave a wood-aged or finished vinegar. Moreover, particular aspects of the present invention also provide products that can be used to produce blended alcohol-containing products and the resulting blended alcohol-containing products that have a desirable taste, flavor, aroma, and/or color comparable to a blended or non-blended alcohol-containing product not including an alcohol-containing beverage produced by the methods of the present invention.

Thus, in some embodiments, the method of the invention may include providing a source of ethanol and a source of components that may add flavor and/or color to an alcohol-containing beverage. The source of ethanol is not particularly limited, and may be for example, but not limited to, a mixture including ethanol and water, wherein the amount of alcohol may be about 5%, 10%, 15%, 20%, 25%, 30%, 35%, 40%, 45%, 50%, 55%, 60%, 65%, 70%, 75%, 80%, 85%, 90% or about 95% alcohol by volume (ABV), or any % ABV within the range of about 0.05% to about 95% ABV, in a mixture including ethanol and water, or in an ethanol/water mixture. In some embodiments, the mixture including ethanol and water may be in a range from about 30% to about 70% ABV, about 40% to about 60%, or about 45% to about 55% ethanol to water. The source of a mixture including ethanol and water may be, in some embodiments, a low cost and/or lower quality ethanol-containing beverage, such as, but not limited to, a lower quality vodka, grain alcohol, light whiskey, corn whiskey, raw distillate, aged whiskey, aged scotch, aged Canadian whiskey, unaged whiskey, for example, white whiskey, unaged scotch, unaged Canadian Whiskey, unaged rum, unaged tequila, rum, tequila, new wine, bright tank beer, beer, wine, or the like. In some embodiments, the source of alcohol may be the charged liquid.

Similarly, the components that may add flavor and/or color to the alcohol-containing beverage are not particularly limited. In some embodiments the components that add flavor and/or color to the alcohol-containing beverage may be, for example, but not limited to: oak wood chips and/or oak wood staves; the wood component from old bourbon barrels; the wood component from wine barrels the wood may be treated or modified prior to using including charring, toasting, treated with enzymes, or other processes, the wood may also be from other species that may impart desired flavors such as apple wood, cherry wood, hickory wood, beech wood, mesquite wood, maple wood, white oak, red oak, French oak, live oak, pin oak, acacia and other woods that would be apparent to one of ordinary skill in the art; wood that has been pre-treated by soaking in wine, port, bourbon, whiskey, spices, extracted flavors, fruit juices, hot sauces, other organic extractions; spices, for example, but not limited to, cinnamon, nutmeg, clove, allspice, anise, basil, bay leaves, caraway seed, cardamom, celery seed, chervil, coriander, cumin seed, dill seed, fennel seed, fenugreek, ginger, horseradish, mace, marjoram, mustard flour, oregano, paprika, parsley, black pepper, white pepper; red pepper, jalapenos, rosemary, saffron, sage, savory, star aniseed, tarragon, thyme, turmeric and vanilla; grasses such as lemon grass, and other grass; and wood from other trees such as, but not limited to, apple, pear, pecan, cherry, mesquite, and hickory, that is in the form of chips or staves. In particular, the components that may add flavor and/or color to the alcohol-containing beverage are not artificial flavorings or artificial colors, i.e., the flavor components are natural flavorings.

Moreover, the source of the components that may add flavor and/or color to the alcohol-containing beverage is not particularly limited. For example, wood chips and/or staves may be derived from, for example, aging barrels from a bourbon or whiskey distillery, such as, but not limited to, Buffalo Trace, Jack Daniels®, Jim Beam® White Label, Maker's Mark®, Knob Creek®, or Woodford Reserve®.

EXAMPLES

The following examples have been included to provide guidance to one of ordinary skill in the art for practicing representative embodiments of the presently disclosed subject matter. In light of the present disclosure and the general level of skill in the art, those of skill can appreciate that the following examples are intended to be exemplary only and that numerous changes, modifications, and alterations can be employed without departing from the scope of the presently disclosed subject matter.

Example 1

In FIG. 1, an example of one embodiment of the technology is shown. In this particular example, a series of oak barrels are connected via a copper piping system. Between each of the barrels there exists a valve that prevents the liquid from flowing freely barrel to barrel. These valves are three-way valves that allow for sampling between the barrels. Screens are inserted into the barrel and wood chips are added above the screen to fill the void in the barrel. The particular wood chips contain chips of varying levels of toasting from heavily toasted to no toasting at all. Additionally, a small portion of charcoal is mixed in with the wood chips. A port where the piping between barrels is connected is located approximately half-way up the barrel so that it is slightly above the screen. The port is designed so that only the bottom portion of the wood chips are in contact with the spirit and the spirit is allowed to wick upward and through the wood chip bed. Added to each barrel is a heating system. This is an electrically powered heating blanket that wraps over the lower portion of the barrels. The bungs are a composite chemically inert rubber material with a hole drilled through the bung. Passing through this hole is a thermal probe that extends in the air above the level of the spirits. This thermal probe is then connected to a thermostat which controls that heating blanket. The temperature for each barrel can be control independently. The temperature in this example is controlled to about 100 degrees Fahrenheit.

Periodically, spirit is added into the barrel 1. The spirit in this case was processed through a technology described in PCT International Publication No. WO 2018208946. The chips used in the process were a used bourbon barrel obtained from Mystics Farm and Distillery (Durham, NC) and chipped using a mechanical chipper. The spirit was processed at 135 proof and then reduced to 100 proof after processing. The process extracts and removes soluble wood components that from the toasted wood chips. The resulting spirit has the distinct characteristic of whiskey in terms of color and flavor.

The set of barrels is cycled by adding a quantity of spirit to barrel number one through the bung, while keeping all valves closed. The fresh spirit is then allowed to rest for a period of 5 to 30 minutes. Then the valve between barrel 1 and barrel 2 is open and the levels are allowed to come to equilibrium. The two barrels are then allowed to rest again for 5 to 30 minutes. It should be noted that the level in barrel one is now again at its original level. The valve to barrel three is then opened and the level is allowed to come to equilibrium. The barrels are allowed to rest for 5 to 30 minutes. The valve between barrel three and four is then opened. The levels in barrel two and three then return to their original levels. Again, the liquid in barrel four is allowed to rest for 5 to 30 minutes. The valve between barrel four and five are then opened and allowed to come to equilibrium. The barrels rest for 5 to 30 minutes. The valve between barrel five and six is then opened and allowed to come to equilibrium. The barrels then rest of 5 to 30 minutes. Finally, the valve exiting barrel six is opened and the level in all barrels is then returned to their original levels. The product exiting the barrels has distinctively changes during this processing. The spirit now has the distinct aroma and flavor typically associated with bourbon. In this example, the liquid was added to the first barrel every 4-6 days. The product removed from the last barrel was then characterized. This include notes of ethyl acetate and other fruity aroma such as banana, pineapple, and cherry. A description of the tasting notes are as follows:

Caramel, butterscotch, burnt brown sugar, small amount of granny smith apple, madagascar vanilla on the nose Cinnamon, ethanol, American Oak in the midrange Flu-Cured Tobacco, leather, and heavy wood tannin notes on the finish, grain note more prevalent on the second taste.

The spirit produced from this apparatus was analyzed by gas chromatography. Gas chromatography is a means to characterize a material without generally decomposing the sample. The sample is vaporized and passes through a column by means of a carrier gas. Different compounds take different amounts of time to pass through the column. The resulting chromatograph is characteristic of the composition of the material. The method used was based on of Lynam, K.; Zou, Y. Agilent Application Note: "Analysis of Distilled Spirits Using and Agilent J&W DB-WAX Ulra Intert Capillary GC Column," 11 Mar. 2016. The instrument used was an Agilent 7820A GC (Santa Clara, CA) with a Phenomenex Zebron ZB-WAX Capillary GC Column, 30 m×0.32 mm×0.50 µm column. The inlet temperate was 250° C. with a 20:1 split. The oven profile was 40° C. for 4 min, up to 200° C. at 12° C./min, 200° C. for 5 min (22.333 min total run time). The carrier gas was helium with a 1.2 ml/min flow rate. An FID detector was used for the measurement of the sample. Air flow was 450 ml/min and hydrogen flow was 40 ml/min with make-up helium at 40 ml/min. FIG. 2 shows the comparison between the spirit processed as described in this example and removed from the last barrel after 56 days with the original input spirit, and a bourdon product that has been aged at least 2 years and is made with a 45% wheat mash bill. This is a commercially available aged product. One will note there are similarities between all three gas chromatographs. According to the protocol used, the peaks labeled as "Ethyl Caproate" (EC) is a chemical compound associated with a fruity pineapple aroma and is indicative of an aged whiskey. One will note the increase in the EC peaks after processing through the apparatus. The area under these peaks may be used to indicate the amount of a particular substance in the sample. In the input liquid, the peak area of the EC is 5.8 pA*s, while the peak area in the sample processed through the apparatus is 82.6 pA*s indicating a significant increase in the "aged" character of the liquid. The peak area of EC for the traditionally aged spirit is 67.5 pA*s.

Example 2

Another example of this technology uses impermeable containers such as glass media bottles. In this example, 1-liter media bottles are filled with wood chips. The wood chips are toasted and mixed with a small fraction of charcoal. Added to the bottle is about 150 ml of distilled spirit. The spirit has a mash bill of 21% rye, 4% malt, and 75% corn. It is distilled at no more than 160 proof. The proof is lower to 135 and it is added to the glass media bottle. The bottle is then sealed and the gently rolled and shaken such that the spirit coats all of the wood chips. A series of four of these bottles are created and are number in order from 1 to 4. The seal media bottles are placed into a water bath controlled to 105 degrees Fahrenheit. Every three days the bottles are removed from the water bath rolled and shaken to once again coat the wood chips with the spirit. About 75 ml of bottle one is removed and transferred to bottle two. Bottle two is then rolled and shaken so the spirit coats the wood chips. From bottle 2 about 75 ml of spirit is removed and transferred to bottle three. Bottle three is rolled and shaken so that the spirit coats the wood chips and then 75 ml is removed and placed in bottle 4. Again bottle 4 is rolled and shaken and then 75 ml of spirit is removed, and this material has the characteristics of aged whiskey in terms of appearance aroma and flavor. To bottle 1 is added 75 ml of fresh spirit and the process can be repeated again in three days. It should be noted that as the process ages the characteristics of the whiskey changes. Thus, the full effect may take a period of time to establish an effective bioprocessing unit.

Example 3

In this example, an embodiment as shown in FIG. 1 is used. In this particular example, a series of oak barrels are connected via a copper piping system. Between each of the barrels there exists a valve that prevents the liquid from flowing freely barrel to barrel. These valves are three-way valves that allow for sampling between the barrels. Screens are inserted into the barrel and wood chips are added above the screen to fill the void in the barrel. The particular wood chips contain chips of varying levels of toasting from heavily toasted to no toasting at all. Additionally, a small portion of charcoal is mixed in with the wood chips. A port where the piping between barrels is connected is located approximately half-way up the barrel so that it is slightly above the screen. The port is designed so that only the bottom portion of the wood chips are in contact with the spirit and the spirit is allowed to wick upward and through the wood chip bed. Added to each barrel is a heating system. This is an electrically powered heating blanket that wraps over the lower portion of the barrels. The bungs are a composite chemically inert rubber material with a hole drilled through the bung. Passing through this hole is a thermal probe that extends in the air above the level of the spirits. This thermal probe is then connected to a thermostat which controls that heating blanket. The temperature for each barrel can be control independently. The temperature in this example is controlled to 100 degrees Fahrenheit. In addition to allowing the spirit to make its way through the barrels, added to the wood chips are a set of wood chips that have been cultured with microorganisms. These microorganisms were cultured separately in a glass bottle under by first wetting toasted wood chips with unaged high proof ethanol spirits (135 proof) and allowing them to sit exposed to the open atmosphere for a period of 1 week in the laboratory. The wood chips were then placed into a 1-liter media bottle such that they filled the volume of media bottle. The bottle was then filled with unaged high proof (135) spirits to abut the 200 ml mark on the bottle and then sealed. The bottle was then opened every week for a period of 15 minutes before being resealed. After a period of time, the wood chips were sampled and the microorganisms in the bottle were characterized. A portion of these chips were then added to each of the barrels through the bung. After a period of more than 3 months, the wood chips were sampled in the barrel and the inoculated microorganisms were found to be existent in the barrels as well as within the wood structure of the barrels. Further work has shown that these organisms are capable of producing various compounds that are of interest in aged spirits.

Example 4

In this example, the same embodiment as described in Example 1 is used. The high proof spirit that is used is rum rather than a whiskey base. The spirit may first be processed as described in the example and using previously disclosed technology (see e.g., PCT International Publication No. WO 2018208946) or it may be added as a clear spirit.

The methods and systems of the present invention provide rapid aging for alcohol-containing beverages and a rapid finishing technology for aged and non-aged alcohol-containing beverages. The process is generally achievable using methods involving the controlled growth of microorganisms under conditions and using equipment and reagents distinct from conventional technologies. Benefits of the present technology include, but are not limited to mouthfeel, body, taste, aroma, stability, scalability, rapid aging, blending suitability, lower cost, and/or decreased time to market associated with the final product that equals or exceeds expectations in these areas when compared to other products that have been rapidly aged or allowed to mature in an aging process that may range from about 2-35 years, including all numerical values in between. Detectable comparisons in mouthfeel, body, taste, aroma and/or color can be noted in sensory consumer taste panel tests.

Example 5

Wood chips were collected from an embodiment of the technology as shown in FIG. 1. Wood chip samples were used inside the barrel filling the volume of the barrel and making a support media for biological growth within the barrel. Barrel number 1 and barrel number 6 were sampled and the samples were placed in sterile 50 ml conical tubes and then into the refrigerator for storage before processing. 11.63 g of wood chips were collected from the barrel 1 and 16.14 g from the barrel 6. Wood cores of barrel 1 and barrel 6 were taken in two locations from each barrel—one above the liquid interface and one below the liquid level. Each of the cores were then cut in half to provide an inner and an outer barrel core slice.

Following sample collection, a Qiagen Power Soil genomic DNA (gDNA) isolation kit was used to isolate microbial DNA from the samples. The Power Soil genomic DNA isolation protocol was followed using the recommended amount of sample material. Of the 12 samples shown in Table 1 below, only one of them (#8) yielded a sufficient quantity of DNA that would be required for preparation of a DNA library (~40 ng/µl DNA, 50 µl total volume).

TABLE 1

Isolation of microbial DNA

| Sample # | Sample Description | DNA Concentration (ng/ul) | A260/280 |
|---|---|---|---|
| 1 | Top barrel wood chips replicate #1 | 0.00 | |
| 2 | Top barrel wood chips replicate #2 | 0.636 | |
| 3 | Bottom barrel wood chips replicate #1 | 0.831 | |
| 4 | Bottom barrel wood chips replicate #2 | 3.4 | |
| 5 | Top barrel upper wood core, outer side | 2.6 | |
| 6 | Top barrel upper wood core, inner side | 3.21 | |
| 7 | Top barrel lower wood core, outer side | 1.19 | |
| 8 | Top barrel lower wood core, inner side | 76.34 | 1.6 |
| 9 | Bottom barrel upper wood core, outer side | 2.876 | |
| 10 | Bottom barrel upper wood core, inner side | 11.51 | |
| 11 | Bottom barrel lower wood core, outer side | 10.43 | |
| 12 | Bottom barrel lower wood core, inner side | 0.00 | |

To improve gDNA yields, a new effort to subculture microbes from the wood chips and wood cores was made. In this case, wood pieces from each of the original samples were used to inoculate either 5 ml of LB or M9 media+0.2% glucose. Streak out plates from the liquid cultures were made. Colonies were grown from cultures inoculated with wood from the following samples as noted in Table 2 below.

Colony PCR was performed for the 5 isolates using universal 16S rDNA (8F and 1492R) and fungal ITS primers (ITS1 and ITS2). PCR amplification was successful for all five isolates, and the amplified DNA was sent to Eton Biosciences for sequencing. BLAST analysis of the sequences was used to identify the isolates as shown in Table 2.

TABLE 2

Samples and colony identification

| Sample # | Sample Description | Sample Identification |
|---|---|---|
| 1 | Top barrel wood chips | *Staphylococcus warneri* |
| 2 | Top barrel lower wood core, inner side | *Penicillium* sp. SCAU-F-3 |
| 3 | Bottom barrel upper wood core, inner side | *Staphylococcus pasteuri* |
| 4 | Bottom barrel lower wood core, outer side, isolate #1 | *Penicillium* sp. SCAU-F-191 |
| 5 | Bottom barrel lower wood core, outer side, isolate #2 | *Terribacillus goriensis* strain IHB B 17507 |

*Staphylococcus warneri* and *Staphylococcus pasteuri* are common skin flora community members but have also been found in soils and in potting mixes (*Staphylococcus warneri*) and as beneficial plant endophytes (e.g. jute, *Staphylococcus pasteuri*). *Penicillium* sp. is a lignocellulose degrader and can also tolerate high levels of ethanol. *Terribacillus goriensis* is a gram-positive, moderately halotolerant, aerobic bacterium that was originally isolated from sea water from off the coast of Busan Korea.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A system for preparing an ethanol-containing beverage comprising:
a plurality of containers, wherein each of the containers defines an interior space and include a partition to divide the interior space of the container, wherein the partition comprises a screen, each container comprising at least one aperture wherein the at least one aperture comprises at least one selected from the group consisting of an inlet and an outlet;
a conduit system connecting the plurality of containers in series, wherein the conduit system comprises piping segments extending between an outlet of one container and an inlet of an adjacent container in the series thereby fluidly connecting each adjacent container in the series, wherein at least one piping segment comprises at least one valve configured to prevent a liquid from flowing freely between the adjacent containers connected by the at least one piping segment;
a wood material positioned on and supported by one side of the partition; and
at least one heating mechanism positioned external to at least one container for heating the at least one container.

2. The system of claim 1, wherein the wood material is subjected to heat, toasted, charred, subjected to pressure, treated with enzymes and/or exposed to microorganisms.

3. The system of claim 1, further comprising:
a biological growth medium and/or physical support located within the interior of at least one container;
microorganisms suspended on and/or in the biological growth medium and/or physical support, wherein the biological growth medium and/or physical support facilitate the controlled growth of the microorganisms; and
wherein the microorganisms are selected from the group consisting of yeasts, fungi, molds and bacteria.

4. The system of claim 1, wherein a product can be added to and/or removed from an individual container.

5. The system of claim 1, wherein a controlled amount of gas can be added to and/or removed from an individual container.

6. The system of claim 5, wherein the gas is air, oxygen, nitrogen, carbon dioxide or helium.

7. The system of claim 1, wherein the outlet of at least one container is above the inlet of the at least one container.

8. The system of claim 1, wherein at least one container in the series of containers is elevated above the adjacent container in the series of containers.

* * * * *